United States Patent [19]

Woollenweber

[11] Patent Number: 5,025,629
[45] Date of Patent: Jun. 25, 1991

[54] HIGH PRESSURE RATIO TURBOCHARGER

[76] Inventor: William E. Woollenweber, 3169 Camino del Arco, La Costa, Calif. 92009-7856

[21] Appl. No.: 325,916

[22] Filed: Mar. 20, 1989

[51] Int. Cl.$^5$ ............................................. F02B 37/00
[52] U.S. Cl. ...................................... 60/600; 60/602; 60/611; 415/160
[58] Field of Search ................ 60/600, 601, 602, 611; 415/148, 150, 151, 154.3, 159, 160, 162

[56] References Cited

U.S. PATENT DOCUMENTS

| | | | |
|---|---|---|---|
| 2,037,395 | 4/1936 | Seelig | 415/160 |
| 2,306,742 | 12/1942 | Moody | 415/160 |
| 2,336,010 | 12/1943 | Gregory | 415/159 |
| 2,874,642 | 2/1959 | Forrest | |
| 3,043,636 | 7/1962 | McInnes et al. | 308/121 |
| 3,056,634 | 10/1962 | Woollenber, Jr. et al. | 308/78 |
| 3,068,638 | 12/1962 | Birmann | |
| 3,096,126 | 7/1963 | Woollenweber, Jr. et al. | 308/9 |
| 3,137,477 | 6/1964 | Kofink | |
| 3,218,029 | 11/1965 | Wooollenweber, Jr. | |
| 3,232,043 | 2/1966 | Birmann | 60/611 |
| 3,270,495 | 9/1966 | Connor | |
| 3,292,092 | 12/1966 | Germann | 328/179 |
| 3,292,364 | 12/1966 | Crazier | |
| 3,303,994 | 2/1967 | Morooka | |
| 3,383,092 | 5/1968 | Cazier | |
| 3,390,926 | 7/1968 | Woollenweber, Jr. | 308/122 |
| 3,408,046 | 10/1968 | Woollenweber, Jr. | |
| 3,423,926 | 1/1969 | Nancarrow et al. | |
| 3,557,549 | 1/1971 | Webster | |
| 3,614,259 | 10/1971 | Neff | 415/205 |
| 3,734,650 | 5/1973 | Reisacher et al. | 417/407 |
| 3,811,741 | 5/1974 | McInerney et al. | 308/122 |
| 3,930,747 | 1/1976 | Woollenweber | 415/205 |
| 3,941,499 | 3/1976 | Kronogard | 415/160 |
| 3,993,370 | 11/1976 | Woollenweber | 308/121 |
| 3,994,620 | 11/1976 | Spraker, Jr. et al. | 415/145 |
| 4,107,927 | 8/1978 | Gordon et al. | 60/605 |
| 4,169,354 | 10/1979 | Woollenweber | 60/600 |
| 4,177,005 | 12/1979 | Bozung et al. | 415/128 |
| 4,209,207 | 6/1980 | Schippers et al. | 308/9 |
| 4,256,441 | 3/1981 | Arora | 417/407 |
| 4,364,717 | 12/1982 | Schippers et al. | 417/407 |
| 4,367,626 | 1/1983 | Schwartzman | 60/606 |
| 4,370,106 | 1/1983 | Lauterbach | 417/407 |
| 4,565,505 | 1/1986 | Woollenweber | 417/407 |
| 4,641,977 | 2/1987 | Woollenweber | 384/99 |
| 4,653,275 | 3/1987 | Sumser et al. | 60/602 |
| 4,719,758 | 1/1988 | Sumser | 60/611 |
| 4,776,168 | 10/1988 | Woollenweber | 60/602 |

FOREIGN PATENT DOCUMENTS

| | | | |
|---|---|---|---|
| 2633587 | 2/1978 | Fed. Rep. of Germany | |
| 3613857 | 10/1987 | Fed. Rep. of Germany | 60/611 |
| 210324 | 12/1983 | Japan | 60/611 |
| 701505 | 12/1953 | United Kingdom | 415/160 |
| 2027811 | 2/1980 | United Kingdom | 415/160 |
| 2172340 | 9/1986 | United Kingdom | 60/600 |

Primary Examiner—Douglas Hart
Attorney, Agent, or Firm—Willian Brinks Olds Hofer Gilson & Lione

[57] ABSTRACT

A turbocharger for an internal combustion engine can provide a two-stage compressor with movable stator blades to shift the compressor performance and match the air output of the turbocharger to varying air requirements of an internal combustion engine. The turbocharger can also be provided with a generally optimum boost pressure ratio of about 4.5:1 to 4.6:1. Such a compressor comprises a first axial-compressor stage, typically providing a 1.3:1 pressure boost ratio, and a second radial-compressor stage, typically providing a pressure ratio of 3.5:1. The turbine of such a turbocharger can be a combination flow turbine and can be provided with closure means to vary the turbine geometry and provide more efficient turbine operation at low-engine speeds. The turbocharger includes a roller bearing system adapted to accommodate imbalance. A control system operating in response to engine-operating conditions can operate the compressor-stator vanes and, if present, the turbine closure means.

29 Claims, 9 Drawing Sheets

CENTRIFUGAL COMPRESSOR

INLET VELOCITY TRIANGLES
RADIAL WHEEL
GEOMETRIC MEAN DIAMETER

AXIAL ENTRY

NEGATIVE PRE-WHIRL

POSITIVE PRE-WHIRL

HIGH PRESSURE RATIO TURBOCHARGER

DESCRIPTION

1. Technical Field

This invention relates to an internal combustion engine turbocharger to provide high pressure ratio compression of air for the cylinders of an internal combustion engine and, more particularly, to a high pressure ratio turbocharger with elements that may be varied in operation of the internal combustion engine to supply compressed air to match the air requirements of the internal combustion engine under widely varying operating conditions.

2. Background Art

Turbochargers for diesel and gasoline engines are well known. Such turbochargers are being manufactured and sold by such companies as Garrett Automotive Division of Allied Signal Corporation, Schwitzer Division of Household International, Cummins Engine Co., and others.

Commercially available small turbochargers generally use radial inflow turbines that are driven by engine exhaust gas directed into the turbine from vaneless volute turbine casings surrounding the small radially vaned turbine wheels of the turbines. Such radial turbines have used open-back wheels where the radial vanes of the turbine wheel extend outwardly beyond the central hub portion of the wheel and are unsupported between one another for a portion of their outer radial length. Material has been omitted from the open-back portion of the turbine wheel of such commercial radial turbines to reduce the rotational inertia of the turbine wheel and improve the transient response of the turbocharger to changes in the energy level of the exhaust of the internal combustion engine. Commercial radial turbines employing open-backed turbine wheels have included the use of a stationary wall located in close proximity to the back of the rotating turbine wheel to prevent excessive gas leakage around the back of the turbine vanes from the pressure side to the suction side during operation. The stationary wall or backing member, like the turbine wheel, is exposed to the high exhaust gas temperatures of the internal combustion engine and must be made from heat-resistant material and designed to avoid excessive distortion that may cause it to contact the rotating turbine wheel and cause turbocharger failure.

In currently available turbochargers, the turbine blades are contoured at their outer extremities to match the contours of the turbine casing defining the turbine inlet and exit openings. Generally, in such turbines, the gas inlet, or tip, diameter of the turbine wheel vanes is usually larger in diameter than the gas outlet, or exit, diameter of the turbine wheel vanes; and the exhaust gases are deflected through 90° or more in their flow between the turbine gas inlet and turbine gas outlet.

Examples of turbines used in commercial turbochargers are shown in "Diesel and Gas Turbine Worldwide Catalog," published yearly by Diesel and Gas Turbine Publication, 13555 Bishop's Court, Brookfield, WI 53005-6286. Page 890 of the 1987 catalog shows a cutaway illustration where the open-back turbine wheel and stationary backing plate are clearly visible.

Also shown is the vaneless volute turbine casing, including its inlet flange which receives exhaust gas from branches of a divided exhaust gas manifold and the volute portion that distributes the exhaust gas around the periphery of the turbine wheel inlet. The volute turbine casing generally includes a meridional or central divider to direct the pulsating flow of exhaust gas from one set of cylinders of an internal combustion engine into one volute passage and the pulsating flow of exhaust gas from another set of cylinders into the other volute passage. The central divider of the turbine casing maintains separation of the two pulsating flows to prevent the effect of pulsations from one set of cylinders from deleteriously affecting the pulsating flow of exhaust gas from the other set of cylinders and to preserve the exhaust gas pulse energy for use in the turbocharger turbine. This volute type of turbine casing is commonly called a "twin-flow" type and is used quite generally throughout the industry. Some types of twin-flow casings have the dividing wall canted toward the exhaust gas outlet while others have the dividing wall positioned radially outward.

The volute passageways of the turbine casing are typically designed to converge in cross-sectional area from the inlet flange to "throat" sections located just prior to the volute passageway openings to the turbine wheel. The cross-sectional areas of the passageway throats and openings control the speed of rotation of the turbocharger when installed on an engine and operated by its exhaust gas. If the throat and opening areas are large, the turbocharger turbine receives exhaust gas at lower velocity and thus rotates at lower speed on the engine. If, on the other hand, the throat and openings are smaller, the smaller throat and opening areas produce higher exhaust gas velocities entering the turbine wheel and drive the turbocharger turbine at higher speeds, producing a higher boost pressure and a larger quantity of air for combustion in the engine cylinders.

U.S. Pat. No. 4,565,505 entitled "Combination Flow Turbine for Internal Combustion Engine Turbochargers" describes a turbine where the meridional dividing wall is canted away from the exhaust gas outlet and where one volute passageway discharges exhaust gas into the rear portion of the turbine wheel vanes generally axially and the other volute passageway discharges exhaust gas into the outer diameter of the turbine wheel vanes, generally radially inward, thus forming a "combination flow" turbine. Such combination flow turbines provide turbochargers with efficiency advantages over standard types of radial inflow turbines. U.S. Pat. No. 4,776,168 discloses a further improvement in turbocharger turbine efficiency, and one that is particularly advantageous with the combination flow turbine of U.S. Pat. No. 4,565,505. With this improvement, the turbocharger turbine is provided with a closure means to channel all of the engine exhaust gas into one volute passageway, which, with the combination flow turbine, is the volute passageway providing generally axial flows. With this improvement, the other volute passageway is blocked at both ends, and an efficiency-robbing outflow of turbine-driving exhaust gas into the unused volute passageway is prevented by the closure means.

Commercial turbochargers typically use radial outflow or centrifugal compressors to supply air at higher than ambient pressure to the cylinders of internal combustion engines. Page 890 of the 1987 "Diesel and Gas Turbine Worldwide Catalog" referred to above shows a radial compressor component, which usually consists of a vaned radial compressor wheel or rotor surrounded by a vaneless or vaned diffuser which discharges compressed air into a volute-type compressor casing with a tangential outlet. The tangential outlet is typically connected to the engine intake manifold system, which may or may not contain an aftercooler to cool the compressed air prior to its delivery to the engine cylinders. FIG. 1 illustrates the small centrifugal compressors typically used in commercial turbochargers.

Although the small, radial, vaned, centrifugal compressors are inexpensive and relatively efficient, their flow characteristics are not well matched to the air requirements of many diesel and gasoline engines. The output of the centrifugal compressor, when matched to the full load and speed condition of an engine, falls short of supplying an adequate amount of compressed air at the lower engine speed and load conditions, particularly if the engine is required to produce a rising torque output as engine speed is reduced. To overcome this deficiency to some extent, the throat areas of the volute passageways and turbine inlets are reduced to a value smaller than that needed to provide sufficient air at rated engine speed and load. This design increases the velocity of the exhaust gas driving the turbine and increases the air supply generated by the radial compressor at low engine speeds, but tends to overspeed the turbocharger at maximum engine speed and load. In addion, reducing the turbine casing throat areas far enough so that the turbocharger can provide a compressed air flow sufficient to allow an engine to produce high torque at low engine speed usually adversely affects turbocharger turbine efficiency over the entire engine operating range.

Variable geometry turbocharger turbines have been devised to overcome the aforementioned undesirable characteristics of centrifugal compressors used in turbochargers. For example, variable geometry turbines have used movable turbine nozzle vanes located outwardly from the radial turbine wheel where the throat area of the turbine nozzles can be changed to regulate the speed of the turbocharger rotor to meet engine air requirements at various engine speeds and loads. U.S. Pat. Nos. 3,137,477 and 4,177,005 illustrate two such variable geometry turbine devices. U.S. Pat. No. 3,557,549 shows a diverter valve for directing exhaust gas from all engine cylinders into one volute passageway of a twin-flow turbine casing at low engine speeds to increase the turbocharger speed and to supply larger quantities of air to the engine cylinders. At high engine speeds, the diverter of U.S. Pat. No. 3,557,549 is positioned to allow the normal direction of exhaust gas flow into both volute passages, thereby increasing the effective turbine nozzle area and limiting the maximum speed of the turbocharger to safe levels. However, in the system of U.S. Pat. No. 3,557,549, the engine which has been directed into one volute of a radial turbine casing is allowed to flow into the open end of the unused volute passageway from the turbine wheel periphery, resulting in a significant reduction in turbine efficiency. U.S. Pat. No. 4,776,168, described above, discloses a more efficient, simple, and reliable variable geometry turbine system.

The performance of small centrifugal compressors used in commercial turbochargers, such as the small compressor shown in FIG. 1, is usually represented by a pressure vs. volume flow graph with compressor efficiency values superimposed. A performance map of a well-developed centrifugal compressor is shown in FIG. 2. The shape of the map represents the result of many years of development to tailor the characteristics of the compressor to fit engine air requirements as closely as possible. Superimposed on the map is the air requirement envelope of a diesel engine rated 350 BHP (brake horsepower) at 2100 RPM. Line A-C is a 1300 RPM engine speed line from zero load at Point A to full load at Point C. Point C represents the air pressure and flow provided by the turbocharger compressor at the torque peak power point of the engine. Line B-D is the 2100 RPM engine speed line where Point D represents the air pressure and flow provided by the compressor at the full rated load point of 350 BHP. Line C-D is the locus of air pressure and flow provided along the full load torque curve of the engine when the engine is operated at sea level altitude. Line A-B is the locus of air pressure and flow provided by the compressor when the engine is operated from 1300 RPM to 2100 RPM at zero power output (no load). The envelope bounded by lines connecting Points A-C-D-B is the envelope of air pressure and flow provided by the turbocharger compressor when the engine is operated between 1300 RPM and 2100 RPM and from zero to full load at sea level. This area is the normal air requirement of the engine and is shown well matched to the turbocharger compressor characteristic because the envelope lies well located in the area of highest compressor efficiency.

The surge line of the compressor defines a limit of stable operation. Reducing air flow to the left of the surge line produces intermittent pulsation and interruption of steady air flow through the compressor and represents unstable compressor operation. Thus, a compressor cannot be matched to an engine when the pressure and flow extends into the surge area.

The area on the right where speed lines are converging and falling rapidly is the choke area of the compressor, and compressor efficiency falls to very low values as the choke area is approached. In matching turbochargers to engines, it is essential that the compressor flow range must be broad enough to cover the engine air requirement at as high a compressor efficiency as possible and that the surge area, choke area, and low efficiency areas are avoided.

When the engine is operated at higher altitudes than sea level, for example, a highway truck crossing the mountains in the Western section of the United States, the turbocharger automatically speeds up and supplies an additional volume of the less dense air to the engine cylinders. This is the well-known altitude-compensating ability of a turbocharger. However, this characteristic elongates the air requirement envelope of the engine as superimposed on the compressor performance map, as shown in FIG. 2. At altitudes of 12000 feet, which are reached at some points on U.S. highways, the maximum point on the 2100 engine speed line increases substantially and moves into the region of lower compressor efficiency indicated by Point F. Also, at 12000 feet, the maximum point on the 1300 RPM engine speed line moves upward and approaches the surge line of the compressor indicated by Point E. The Line E-F represents the air pressure and flow provided by the compressor along the torque curve of the engine when the engine is operated at 12000 feet altitude at full power output.

At higher altitudes than 12000 feet, the altitude-compensating characteristics of the turbocharger can cause unstable operation of the compressor and cause the previously described condition known as "compressor surge" on the engine, represented by Point G, which lies within the surge area of FIG. 2. This interrupts the air supply to the engine cylinders, causing loss of power, excessive exhaust smoke, and high exhaust temperature.

The turbocharger compressor must be matched to the engine to avoid the surge area at torque peak and to stay in as high an efficiency area as possible at rated speed and load, both at sea level and at the highest altitude at which the engine is to be operated, to avoid reduction in the maximum power rating of the engine.

It is desirable to rate a given size engine at high horsepower outputs for certain commercial applications and at particularly high horsepower outputs for military engine applications. However, raising the power output of an engine to very high values can raise the air requirement envelope to where the high altitude points fall out of the range capability of fixed geometry, single-stage compressors. This condition is illustrated by the dotted lines in FIG. 2 where the torque peak air requirement, Point G, extends into the surge area of the compressor, and where the rated load and speed point, Point H, extends far into the choke area where the compressor has low efficiency. In addition, the rated load and speed point, Point H, has moved above the maximum speed limit of the compressor.

The common solution to this problem has been to use two turbochargers in series to produce the high boost pressure necessary to obtain very high horsepower outputs. A typical high horsepower rating may require a turbocharger compressor pressure ratio output of, for example, 4.5:1 (or 4.5 times absolute atmospheric pressure) to satisfactorily charge the engine cylinders. If two turbochargers in series are used, and if both typically have a 3.5:1 pressure ratio capability, then the maximum pressure ratio available for charging the engine is $(3.5 \times 3.5)$ 12.25:1. This is far above what existing engines can utilize; and thus, the two-stage, series, turbocharger system represents a solution that is expensive and complicated.

Notwithstanding this extensive and substantial turbocharger development, there remains a need for an efficient turbocharger that can provide higher boost pressures and can match the air requirements of highly rated, heavy-duty internal combustion engines throughout their operating range and operating environment.

DISCLOSURE OF INVENTION

This invention provides an efficient and reliable turbocharger that is capable of providing higher boost pressures and of matching the air requirements of highly rated, heavy-duty, internal combustion engines throughout their operating range and their operating environment. The invention provides a means to move the entire performance map of a turbocharger compressor so that the air requirements of very highly rated internal combustion engines can be met with the highest possible efficiency. The invention permits internal combustion engines to provide high outputs to drive machinery and vehicles under all practical conditions.

The invention provides a turbocharger comprising a two-stage, high-pressure compressor including a first axial compressor stage and a second radial compressor stage. The two-stage compressor includes stator vanes between the first axial stage and second radial stage to guide the air entering the second stage, and these stator guide vanes may be moved to shift compressor performance and the entire compressor performance map of the two-stage compressor to higher flow rates and lower flow rates, with a commensurate shift in the compressor choke area and surge line, respectively. The invention thus provides a simple, reliable, and economical matching of a turbocharger output to the air requirements of highly rated internal combustion engines under all operating conditions by making the compressor performance characteristics continuously variable. Further, the axial compressor stage may be designed to produce a pressure ratio of 1.3:1, and the radial compressor stage may be designed to provide a 3.5:1 pressure ratio to thereby provide, in a single turbocharger, high pressure through pressure boosts of 4.55:1. Turbochargers of this invention provide a performance map that meets the air requirements of highly rated internal combustion engines through their operating duty cycles even at very high altitudes and provide a simple, reliable, and economical solution to the problem of supplying the high boost pressures and air requirements of highly rated internal combustion engines.

Still further improvements in the efficiency and flexibility of the turbochargers of this invention are represented by driving the two-stage compressor with a combination flow turbine, comprising a meridionally divided volute turbine casing with the meridional dividing wall canted away from the turbine exhaust where one volute passageway directs gas into the rear portion of the turbine vanes generally axially and the other volute passageway discharges exhaust gas into the outer diameter of the turbine vanes generally radially. Preferred two-stage turbochargers of this invention including such combination flow turbines can be efficiently matched to the exhaust of the internal combustion engine, can be provided with variable turbine geometry to provide an efficient axial flow turbine at low engine speeds, and can simply and reliably provide further flexible and efficient turbocharger operation to match the air requirements of a highly rated internal combustion engine under widely varying conditions.

The turbocharger system of this invention includes a control associated with the internal combustion engine to sense relevant engine operation variables such as engine load and speed. The control system can provide outputs to operate, in preferred turbochargers of this invention, the stator vanes of the two-stage compressor and the variable geometry turbine closure means, including any associated volute closure means, or diverter valve, to operate the turbocharger in its best turbine and compressor efficiency ranges in providing the air needed by the cylinders of the internal combustion engine.

Further features and advantages of the invention will be apparent from the drawings and more detailed description of the invention which follows.

BEST MODE FOR CARRYING OUT THE INVENTION

Figure 3:
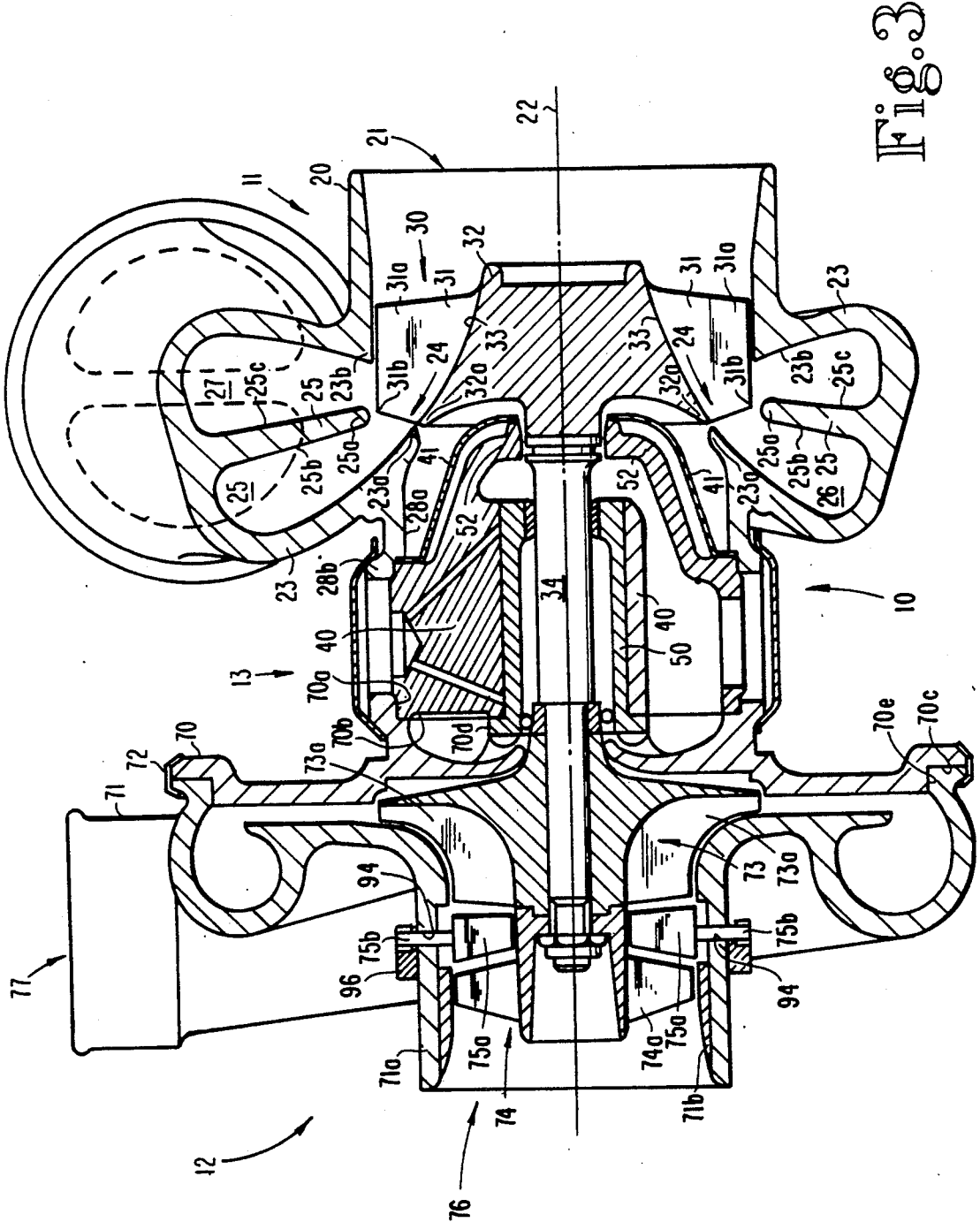
FIG. 3 is a cross-sectional view of a turbocharger of this invention taken at a plane through its central axis of rotation.

Turning now to FIG. 3, a turbocharger 10 incorporating this invention includes generally a means 11 defining a turbine at one end, a means 12 defining a high-pressure, two-stage compressor at the other end, and a means 13 therebetween to support the rotating shaft between the turbine and compressor and its bearing system.

Means 11 defining the turbine includes a turbine casing 20 and a turbine wheel 30 having a plurality of blades 31 extending outwardly from a central core or hub 32. As shown in FIG. 3, the turbine wheel has a maximum diameter that permits tips 31a of turbine blades 31 to pass through exhaust opening 21 of the turbine casing and along its central axis 22, which is generally the intended axis of rotation of the rotating parts of turbocharger 10.

As shown in FIG. 3, turbine casing 20 forms a volute portion 23 that extends around the periphery of turbine wheel 30 and forms an exhaust outlet turbine inlet opening 24. In the embodiment shown in FIG. 3, volute portion 23 of turbine casing 20 includes a meridional or central divider 25 forming two volute passageways 26 and 27 that extend around the periphery and direct their respective gas outlets into the turbine through turbine inlet opening 24. Turbine inlet opening 24 is defined by turbine casing portion 23a at the rear of the turbine and casing portion 23b defining the forwardmost edge of the turbine inlet opening. Where in the description, I use the term "rearwardly" in describing turbine means 11, I refer generally to parts of turbine means 11 lying closest to compressor means 12; and when I use the word "forwardly" in describing turbine means 11, I mean those portions of turbine means 11 lying more in the direction of turbine exhaust opening 21.

As shown in FIG. 3, turbine casing portion 23 forming the volute leading to turbine inlet opening 24 lies generally rearwardly of a plane through rearwardmost portion 32a of the turbine wheel which is perpendicular to its general axis of rotation 22. In the centrally divided turbine casing shown in FIG. 3, volute passageway 26 and central divider 25 lie substantially rearwardly of the plane in which the rearmost points 32a of turbine 30 rotate. Volute passage 27 lies substantially rearwardly of the forwardmost point 23b of turbine inlet opening 24.

An outer surface 33 of central core 32 of turbine 30 is formed in such a manner that lines lying generally along its axis of rotation 22 and tangent to surface 33 over substantially its entire axial extent lie at acute included angles generally less than about 50°, with respect to its axis of rotation 22. As shown in FIG. 3, the included angle adjacent turbine inlet 32a is about 45° and decreases substantially in the direction of turbine exhaust outlet 21.

In the embodiment shown, the tips of turbine blades 31a extend rearwardly to form portions 31b that lie closely adjacent the innermost termination 25a of central divider 25 of volute portion 23. The rearwardmost inside surface of volute portion 23 of casing 20 adjacent turbine inlet 24, i.e., at 23a, directs exhaust gas leaving volute passageway 26 in a direction generally parallel to (i.e., tangent to) outer surface 33 of central core 32 of the turbine wheel at its rearward end, i.e., adjacent 32a. The inside surface 25b forming volute passageway 26 lies at such an angle with respect to outer surface 33 of central core 32 of the turbine and to its axis of rotation 22 that it directs exhaust gas at acute angles with respect to both outer surface 33 of the central core and with respect to its axis of rotation 22. The exhaust gas is directed from volute passageway 27 generally radially with respect to the turbine wheel. The surface 25c forming volute passageway 27 generally directs exhaust gas from volute passageway 27 at an acute angle with respect to outer surface 33 of central core 32 of turbine 30 and generally toward exhaust opening 21. Thus, in the embodiment shown in FIG. 3, substantially all of the exhaust gas leaving volute portion 26 and some of the exhaust gas leaving volute portion 27 of turbine casing 20 are directed at an acute angle with regard to the axis of rotation of the turbine and generally toward exhaust opening 21 of the turbine; and thus, volute portion 23 of turbine casing 20 may be considered to be canted rearwardly of the turbine.

The features of turbocharger 10 embodied in the means forming turbine 11 provide a combination flow turbine, that is, a turbine having axial as well as radial flow, and a reduction in energy lost in deflection of the exhaust gases, and permit the ends of the turbine blades to be extended closely to a termination of any central dividing wall of the volute portion of the turbine casing to reduce communication of gases between the divided passageways; e.g., between vortical passageways 26 and 27. For example, as shown in FIG. 3, exhaust gas from volute passageway 26 is diverted through an acute angle generally less than 45° in its passage through the turbine and a substantial portion of the gas from volute passageway 27 is diverted less than 90°. Thus, the turbine operates with greater efficiency by virtue of its axial flow and reduction of mixing and loss at the turbine inlet opening and the reduction of energy lost due to deflection of the exhaust gases.

As shown in FIG. 3, because of its design and the arrangement of turbine casing 20 and turbine wheel 30, no backup member is required to be located closely adjacent the rear of turbine wheel 30.

Figure 1:
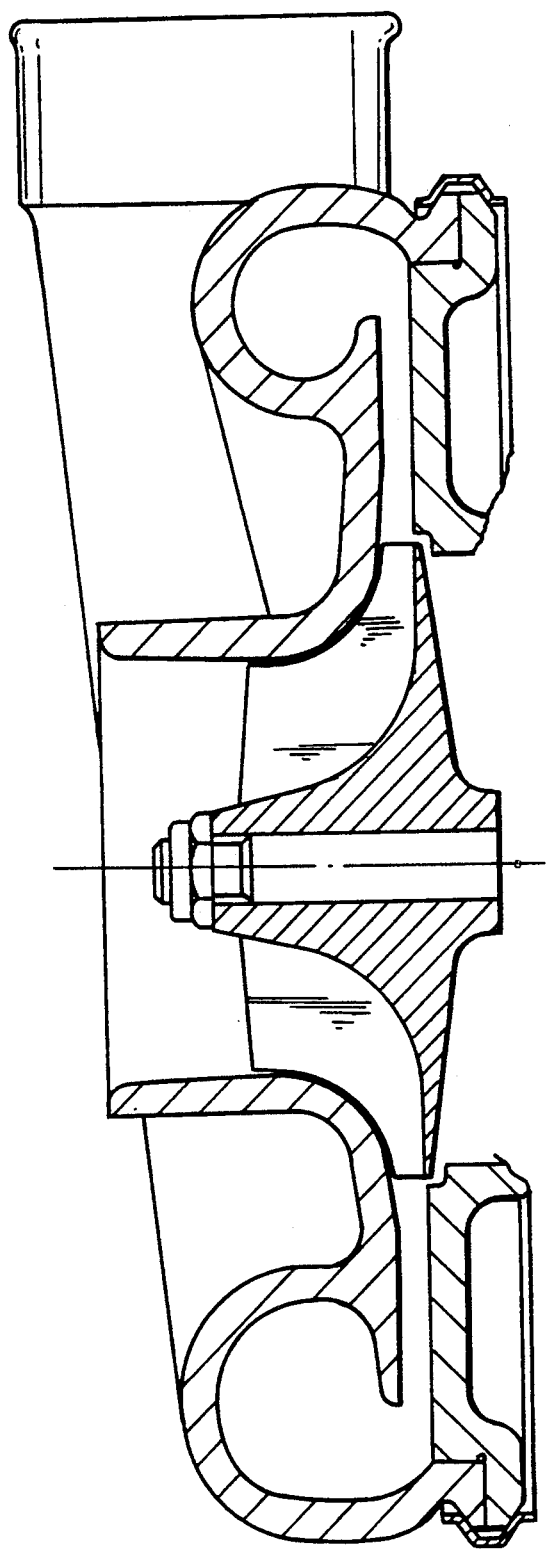
FIG. 1 is a cross-sectional view of a typical commercial turbocharger compressor stage taken through its central axis of rotation.

Means 12 forming the high-pressure, two-stage compressor includes a first compressor housing portion 70, a second compressor housing portion 71, and the peripheral fastener 72 engaging and holding together the first and second compressor housing portions. First compressor housing portion 70 includes surfaces 70a and 70b adapted to seat upon the bearing housing 40 and to locate the compressor housing, i.e., portions 70 and 71, on the axis of rotation 22 of the turbocharger. The first compressor casing portion can also include a bearing surface 70d adapted to engage the turbocharger bearing system and provide a thrust bearing. As shown in FIG. 3, part 73 and housing parts 70 and 71 form a radial compressor stage. Part 73 forms a radial compressor wheel with a plurality of rotating vanes 73a which may be identical to the radial compressor wheels used in commercially available turbochargers as shown in FIG. 1.

As shown in FIG. 3, means 12 forming the high-pressure, two-stage compressor also includes a first axial compressor stage. The axial compressor stage includes part 74, which forms an axial compressor wheel or rotor with a plurality of rotating vanes 74a, a plurality of stator vanes 75a, and the adjacent parts 71a and 71b of housing portion 71. Stator vanes 75a are journalled in a plurality of bearing holes 94 formed about the periphery of portion 71a of compressor housing part 71. Stator vanes 75a are held in bearing holes 94 by a supporting and operating ring 96, and stator guide vanes 75a may be rotated about their longitudinal axes by the supporting and operating ring 96. The movable stator vanes may be supported and operated by any of a number of structures. For example, each of stator vanes 75a may be formed with a dog (not shown) extending outwardly from its axle portion 75b and into one of a plurality of cooperating annular groove portions (not shown) of supporting and operating ring 96 so that upon rotation of supporting and operating ring 96 about central axis 22 of the turbocharger, the surfaces of supporting and operating ring 96 forming the grooves will engage the dogs of stator vanes 75a and rotate stator vanes 75a about their axle portions 75b.

The means to form the two-stage compressor can thus comprise only a few major parts more than a commercial, one-stage, radial compressor. In the embodiment of the invention shown in FIG. 3, the additional parts defining the axial-compressor stage include an axial compressor rotor 74 which can be mounted on rotating shaft 34 and a compressor housing portion 71 carrying a set of stator vanes 75a and positioning stator vanes 75a intermediate rotating vanes 74a of axial-compressor rotor 74 and rotating vanes 73a of radial-compressor rotor 73. This arrangement permits conversion of commercial turbochargers, with compressors like that shown in FIG. 1, to incorporate the two-stage compressor of FIG. 3 by three major compressor parts that can be assembled to the turbocharger in the following order: a second stage radial-compressor blower 73 which has been adapted to carry and drive part 74, a second compressor housing portion 71 carrying stator vanes 75a and supporting and operating ring 96, and an axial-compressor rotor 74. In addition, such a conversion will preferably include a change of the turbocharger bearing system, as explained further below.

Means 12 defining the two-stage compressor, as shown in FIG. 3 thus includes parts 70, 71, 73, 74, 75a, and 96. Compressor housing portion 71 is adapted to seat on first compressor housing portion 70 and be positioned by bearing surfaces 70c and 70e. Second compressor housing portion 71 forms a compressor inlet 76 and a peripheral compressor outlet 77. An extended tubular portion 71a with insert 71b forms compressor inlet 76, and insert 71b forms an inlet for the axial-compressor stage. The plurality of stator vanes 75a are positioned intermediate the axial-compressor rotor 74 and radial-compressor rotor 73. Axial-compressor rotor 74 includes a plurality of vanes 74a that are adapted to cooperate with the interior inlet surface of insert 71b and the plurality of stator vanes 75a to form an axial-compression stage, preferably boosting the pressure from compressor inlet 76 to the inlet of the radial-compression stage by a factor of 1.3. Radial-compressor rotor 73 includes a plurality of blades 73a to which the compressed air from the axial-compression stage is directed by the plurality of stator vanes 75a. The radial-compression stage formed by radial-compressor rotor 73 and the cooperating portions of second compressor housing portions 70 and 71 preferably increases the pressure from the inlet of the radial-compressor stage to compressor outlet 77 by a factor of 3.5. Thus, the pressure ratio increase from compressor inlet 76 to compressor outlet 77 is in excess of 4:1, preferably about 4.55:1 (i.e., $1.3 \times 3.5$).

Figure 4:
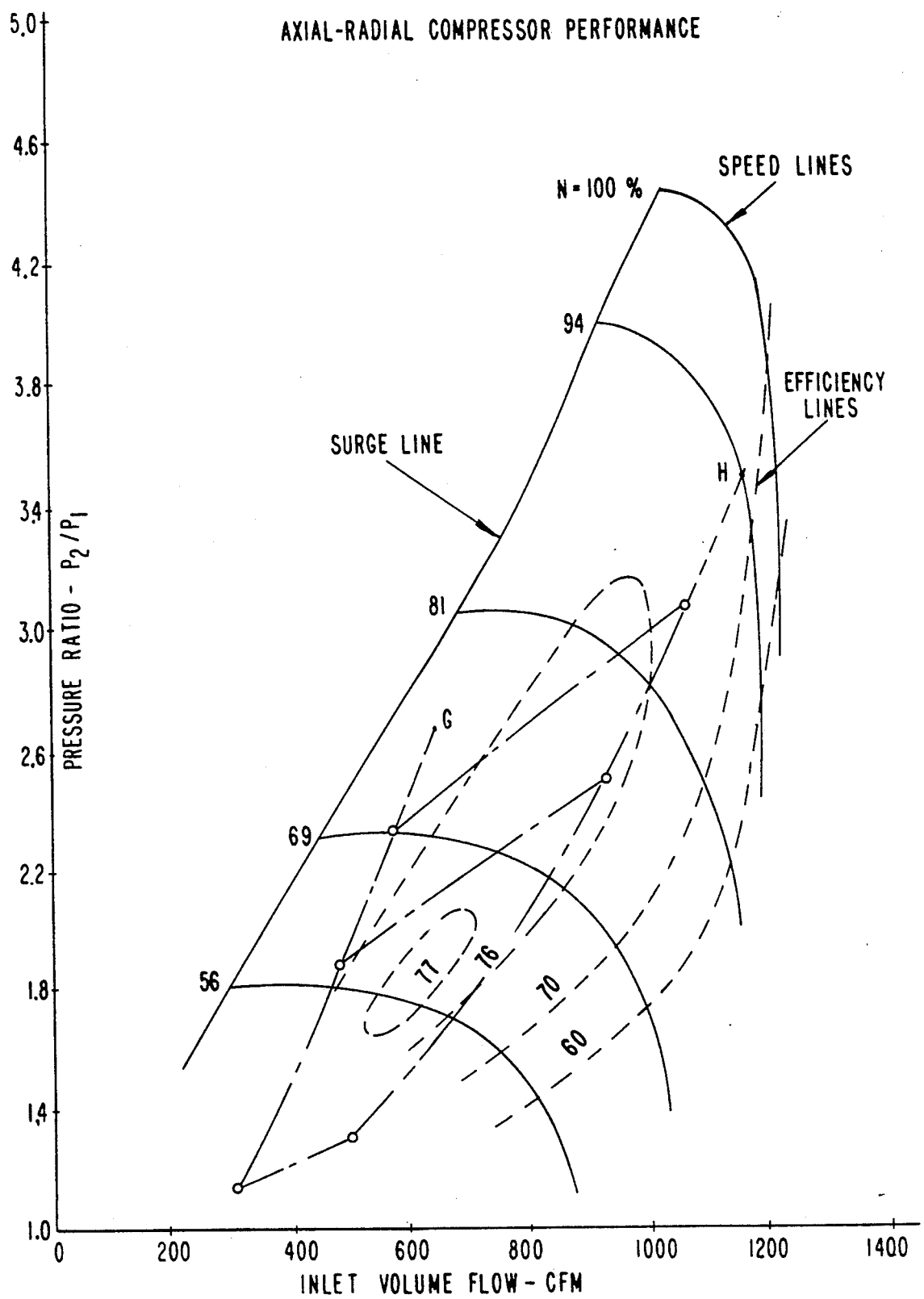
FIG. 4 is a performance map of a conventional, non-variable, two-stage compressor with superimposed air requirements of a highly rated internal combustion engine under expected operating conditions.

The performance map of a conventional non-variable, axial-radial compressor is shown in FIG. 4. In the FIG. 4 case, the radial compressor wheel is the same diameter as that which produced the performance shown in FIG. 2. $N = 100\%$ is the same for both compressors so that the centrifugal stresses are the same for both radial compressor wheels. The addition of the axial stage increases the pressure ratio considerably and produces a compressor performance map that better matches the air requirements of highly rated engines that need to operate at high altitude. As shown on the FIG. 2 performance map of a typical commercial turbocharger compressor, the torque peak Point G extends into the surge area; however, the same Point G on the two-stage, axial-radial compressor map of FIG. 4 can lie well within the stable area of the compressor. Similarly, the rated load and speed Point H lies at only 94% of the maximum speed of such a two-stage compressor. The air requirement envelope of the internal combustion engine, as shown on FIG. 4, can be positioned in the high-efficiency area of the two-stage, axial-radial compressor. Thus, such two-stage, axial-radial compressors can provide higher pressure ratios for highly rated engines as an alternative to two turbochargers in a series.

Highly rated internal combustion engines today can, however, utilize pressure ratios above 4.0. If Point H is moved to higher pressure levels, for example, at pressure ratios above about 3.8, it can move into the choke area of the two-stage, axial-radial compressor; and Point G can move closer or into the surge area, depending on how much torque rise the engine is required to develop.

This invention extends the performance map of a turbocharger, expanding compressor performance beyond the improvement possible with the two-stage, axial-radial compressor and compressor design, reducing the air flow rate possible without compression surging and increasing the air flow rate without choking the compressor, all while maintaining efficient compressor and turbine operation. In this invention, I discovered a means of moving the entire performance field of a turbocharger compressor to higher or lower air flow so that the air requirements of very highly rated engines can be met at the highest possible compressor efficiency. By making the stator vanes of the axial stage of a two-stage compressor movable, as in the turbocharger of FIG. 3, it is possible to produce either positive or negative pre-whirl of the air entering the radial wheel. Positive pre-whirl can shift the entire performance field of a centrifugal compressor to higher flow rates, whereas negative pre-whirl can shift the compressor's performance field to lower flow rates by shifting the surge line to the left.

By making stator guide vanes 75a movable, the direction imparted the air leaving rotating axial vanes 74a and entering rotating radial vanes 73a can be changed. Such changes can be indicated by inlet velocity triangles at the geometric mean diameter of the radial-compressor wheel 73 as shown in FIGS. 5A, 5B, and 5C.

Figure 5A:
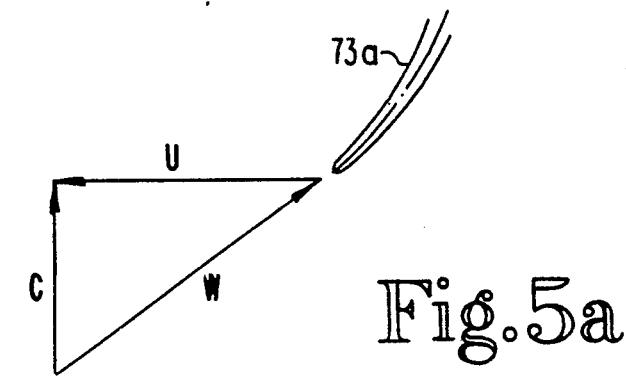
FIGS. 5A–5C are vector diagrams showing the effect of movement of the stator vanes of the two-stage compressor of FIG. 3 on the air velocity at the inlet of its radial compressor stage.
Figure 5B:
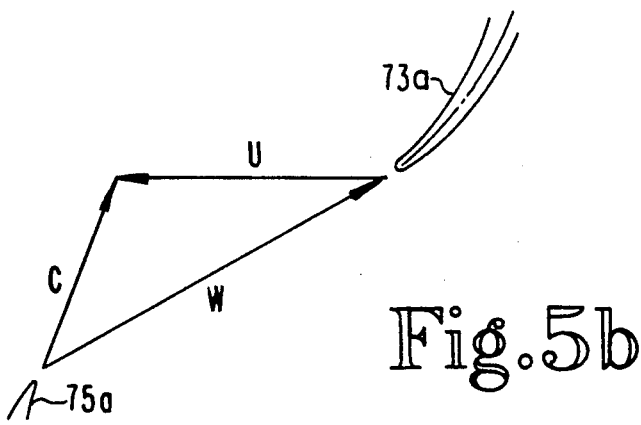
Figure 5C:
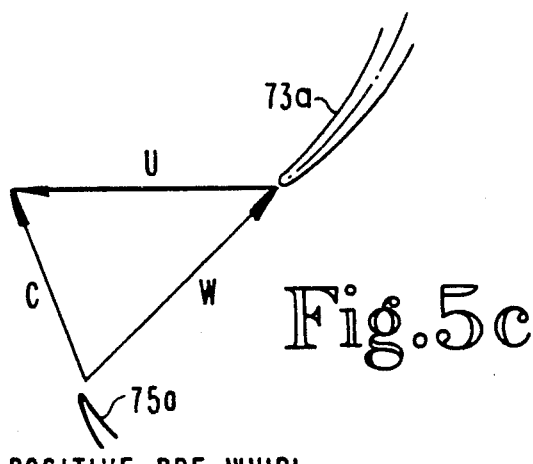

The normal condition at the entrance of radial-compressor wheel 73 is shown in FIG. 5A, where:

U=the blade velocity of radial blades 73a;
C=the absolute air entrance velocity
W=the relative air entrance velocity.

It is usual to design for axial air entry over the entire radial length of the radial-compressor vane, and the guide vane angle of a stator vane is selected so the air enters the wheel with minimum entrance loss.

If stator guide vanes 75a are rotated to produce negative pre-whirl, the inlet velocity triangle is as shown in FIG. 5B. Likewise, if stator vanes 75a are rotated in the opposite direction, positive pre-whirl conditions are produced as shown in FIG. 5C.

Figure 6:
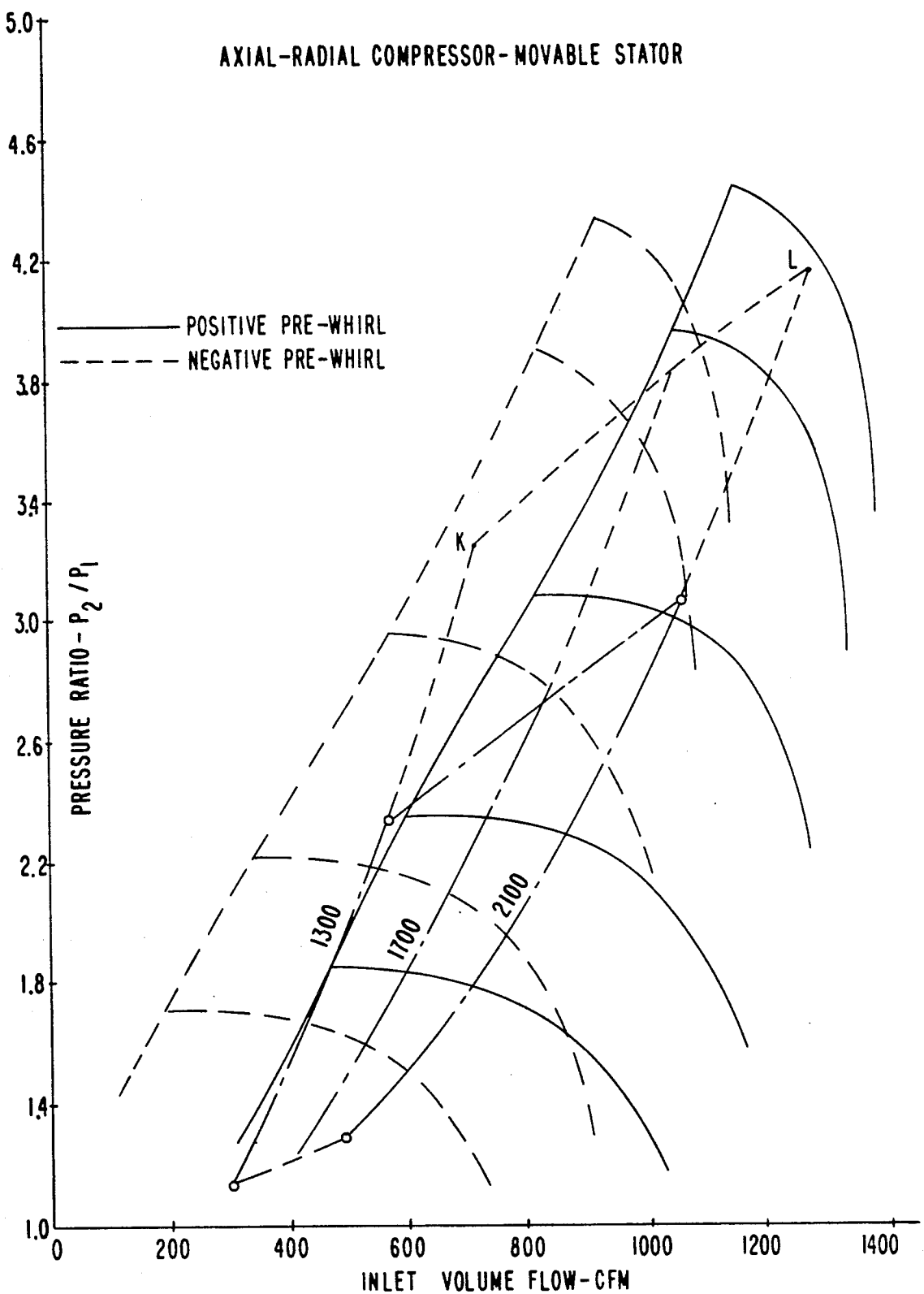
FIG. 6 is a performance map of the variable two-stage compressor of the turbocharger of FIG. 3, with superimposed air requirements of a highly rated internal combustion engine under expected operating conditions.

The beneficial and surprising effect of positive pre-whirl and negative pre-whirl on the ability of axial-radial compressor means 12 to match the air requirement envelope of a highly rated engine is illustrated in FIG. 6. When the engine speed is reduced under load, movable stator vanes 75a can be rotated to negative pre-whirl positions, shifting the compressor characteristic to lower flows which match the engine air requirement more closely as shown in FIG. 6. As also shown in FIG. 6, when the engine is running at rated load and speed, movable stator vanes 75a can be rotated to positive pre-whirl positions, thereby shifting the compressor characteristic to higher flow and allowing the engine air requirement to stay in regions of high compressor efficiency. The full load air requirement of very highly rated engines at sea level or highly rated engines operated at high altitude is shown as Line K-L on FIG. 6.

Thus, the invention can match the air requirements of highly rated internal combustion engines and further enhance the performance of the engine by making the compressor characteristic continuously variable through the use of movable stator vanes to ensure that the air requirement of the engine is continually matched by a turbocharger compressor running in stable regions of high compressor efficiency.

As explained in further detail below, the turbocharger system of the invention can include a suitable control that senses engine operating parameters such as load, speed, or both and operates a mechanism that continually rotates stator vanes 75a to the optimum position for a given engine-operating condition, for example, by positioning supporting and operating ring 96 of FIG. 5 about central axis 22 of the turbocharger. Alternately, a simpler control might be employed which moves stator vanes 75a between a first negative pre-whirl position of low flow and a second positive pre-whirl position of high flow to optimally match the air requirement of the engine. The shift between the positive pre-whirl, high-flow position and the negative pre-whirl, low-flow position can take place, for example, when the engine speed approaches about 1700 RPM as shown in FIG. 6. At lower engine speeds than 1700 RPM, the compressor would be shifted to the low-flow position shown by the dotted performance map on FIG. 6, indicated as the negative pre-whirl map.

Note that the torque peak, Point K, lies within the stable area of the negative pre-whirl map and that the rated load speed, Point L, lies well within the positive pre-whirl map. By moving stator vanes 75a in accordance with engine speed and/or load, the air pressure and flow envelope can be maintained in the range of highest compressor efficiency.

Figure 7:
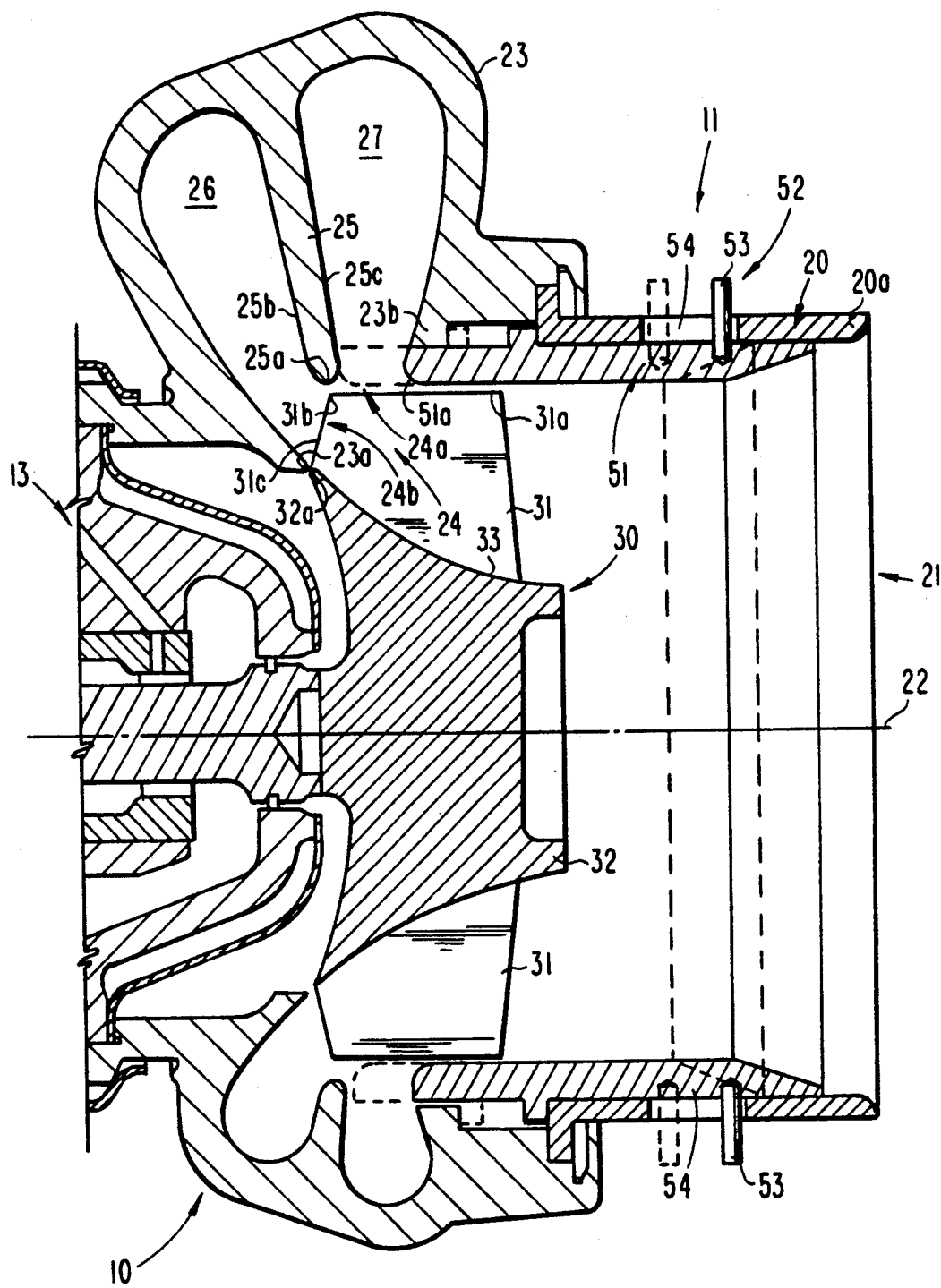
FIG. 7 is a cross-sectional view of a preferred variable turbine for a turbocharger of this invention taken at a plane through its central axis of rotation.

In addition, in turbochargers of this invention, the axial-radial compressor with movable stator vanes can operate in conjunction with various types of variable geometry turbines. FIG. 7 illustrates such a preferred turbine means of turbochargers of this invention. FIG. 7 omits for clarity two-stage, axial-radial compressor means 12 of the turbocharger; but it should be understood that in the invention, turbine means 11 of FIG. 7 drives two-stage, axial-radial compressor means 12 of FIG. 3. The turbine means of FIG. 7 is the same as the turbine means shown in FIG. 3 and described above with one exception. To provide higher turbine-operating efficiencies over a wide range of internal combustion engine operating speeds, such as high-speed operation on level terrain and low-speed, high-torque output operation on mountainous terrain, the turbine of FIG. 7 is provided with a variable geometry component comprising a closure means which is movable between a first position shown in solid line in FIG. 7, in which turbine inlet opening 24 is fully open to permit gas flow into the turbine wheel from both volute passageways 26 and 27 and to a second position, shown in dotted line in FIG. 7, in which turbine inlet opening 24a is blocked to prevent gas flow from first volute passageway 27 into the turbine wheel.

In the embodiment of FIG. 7, the closure means comprises a cylindrical-shaped closure member 51 positioned within exhaust outlet portion 20a of turbine casing 20. Cylindrical closure member 51 is supported within turbine casing portion 20a by a plurality of pins 53 which extend through longitudinal slots 54 in casing portion 20a and which are incorporated within a sliding mechanism generally designated by reference numeral 52.

At high engine speeds, closure member 51 can be in the position shown in solid line in FIG. 7, with both passageways 26 and 27 open and all of the exhaust gas of the engine directed through two openings 24a and 24b into turbine wheel 30 and turbine vanes 31a. At lower engine speeds, closure member 51 can be in the position shown in dotted line in FIG. 7 to close turbine inlet opening 24a and block passageway 27.

Figure 9:
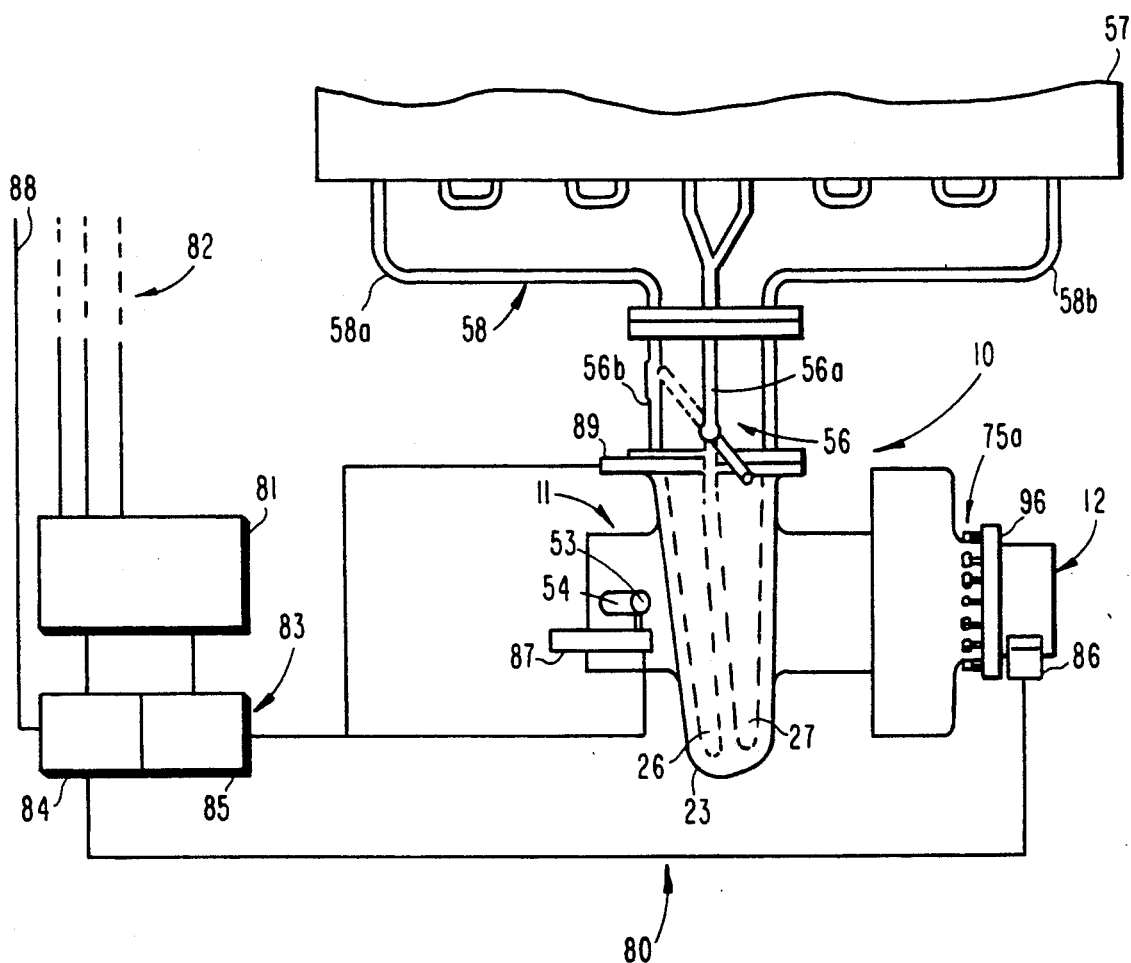
FIG. 9 is a diagram illustrating a control system of this invention to operate the turbochargers of FIGS. 3, 7, and 8.

Simultaneously, with the movement of closure member 51 to block volute passageway 27, all of the engine exhaust gas from manifold 58 can be diverted into passageway 27 if, as shown in FIG. 9, another closure means, such as valve means 56, is positioned upstream of volute portion 23 of the turbine casing between volute portion 23 and engine manifold 58. Valve means 56 can be movable between a first position 56a, shown in solid line, in which volute passageways 26 and 27 are both open to the engine exhaust gas from, respectively, manifold portions 58a and 58b and a second position 56b, shown in dotted line, in which passageway 27 is closed and exhaust gas from engine manifold portion 58a is diverted into passageway 26, which also carried the exhaust gas from manifold portion 58b. Thus, in torque peak operating range, for example, all the exhaust gas from both branches of engine manifold 58 (i.e., from all cylinders of the engine) can be directed into volute passageway 26 of the turbine casing and generally axially into turbine wheel 30 through turbine inlet opening portion 24b (FIG. 7). The dimensions of passageway 26 and back face 31c of turbine wheel 30 can be designed to match the volume of gas flowing at torque peak operating speeds, thus turbine efficiency remains high, approaching that of an efficient axial flow turbine.

When the engine moves into its high-speed range, sliding mechanism 52 can retract closure member 51 back to its first solid line position in FIG. 7 where its end surface 51a is adjacent to turbine casing wall 23b and volute passageway 26 is open. Simultaneously, valve means 56 can be returned to its solid line position 56a (FIG. 9), allowing divided manifold system 58 to deliver exhaust gas from the engine cylinders into divided turbine casing passageways 26 and 27. Thus, such a preferable turbine closure means includes a closure member 51 and valve means 56 and is operable to direct the plurality of flows of exhaust gas from the engine cylinders at the rear 31c of the turbine vanes 31 for axial flow through turbine wheel 30.

With the present invention, a combination axial flow and mixed-flow turbine system can be provided wherein at high engine operating speeds, the turbine comprises a combination-flow turbine; and at low operating engine speeds, the turbine comprises essentially an axial-flow turbine. The turbine system includes variable geometry components comprising closure means including a turbine closure member movable between first and second positions to switch the turbine from its combination-flow mode to its axial-flow mode, and a diverter valve mechanism to control simultaneously the flow of gases between the engine manifold and the divided volute of the turbine casing. The variable turbine geometry mechanism is relatively simple in design and durable, and maintains high turbine efficiency throughout a wide range of engine-operating speeds with significant benefits in engine performance and fuel consumption. Turbochargers of the invention can be designed to operate at maximum efficiency with the engine running at high speeds and at maximum speeds which are not damaging to the turbocharger. Turbochargers incorporating this invention can be designed to optimize engine-operating conditions at both maximum-rated engine speed and maximum-rated engine torque output.

Figure 8:
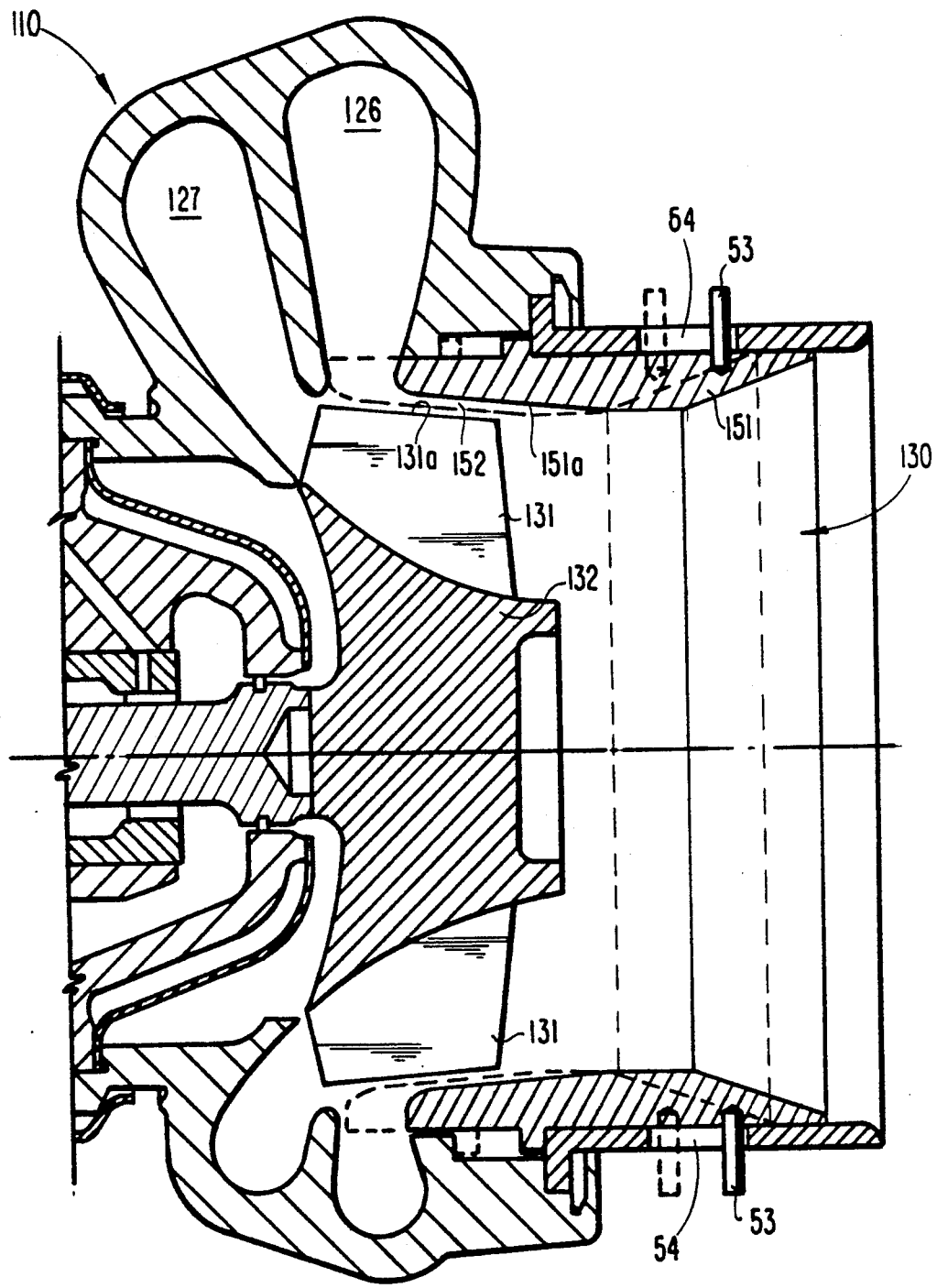
FIG. 8 is an enlarged cross-sectional view of another embodiment of a variable turbine for preferred turbochargers of this invention taken at a plane through its central axis of rotation.

FIG. 8 illustrates a turbocharger 110 according to an alternative embodiment of the invention for providing improved control over the speed of the turbocharger. In the FIG. 8 embodiment, the outside tips 131a of turbine vanes 131 are tapered to give the outside diameter of the turbine wheel a generally conical shape. The closure means is a movable cylinder 151 with its inside surface provided with a somewhat conical surface portion 151a.

In the embodiment of FIG. 8, when the movable cylinder 151 is in its first open position, indicated in solid lines in FIG. 8, a larger than normal clearance 152 exists between the outside of the turbine wheel vanes 131a and the inside surface of cylinder 151. Since tapered vane tips 131a and conical inside surface 151a define a significant clearance 152, the exhaust gas from volute passageways 126 and 127 will leak through clearance 152; and the energy of the leaking portion of the exhaust gas will not be imparted to turbine wheel 132. Although clearance 152 decreases turbine efficiency to a controlled extent, it can provide an additional limitation on the maximum speed of the turbocharger when the engine is operating at high speeds.

When cylinder 151 is in the position indicated in dotted line in FIG. 8, the clearance between the tips of turbine wheel vanes 131a and surface 151a of closure means 151 returns to normal small clearance, thus creating a condition of high axial turbine efficiency and providing the high-engine boost necessary to produce high torque at low-engine speeds.

Figure 2:
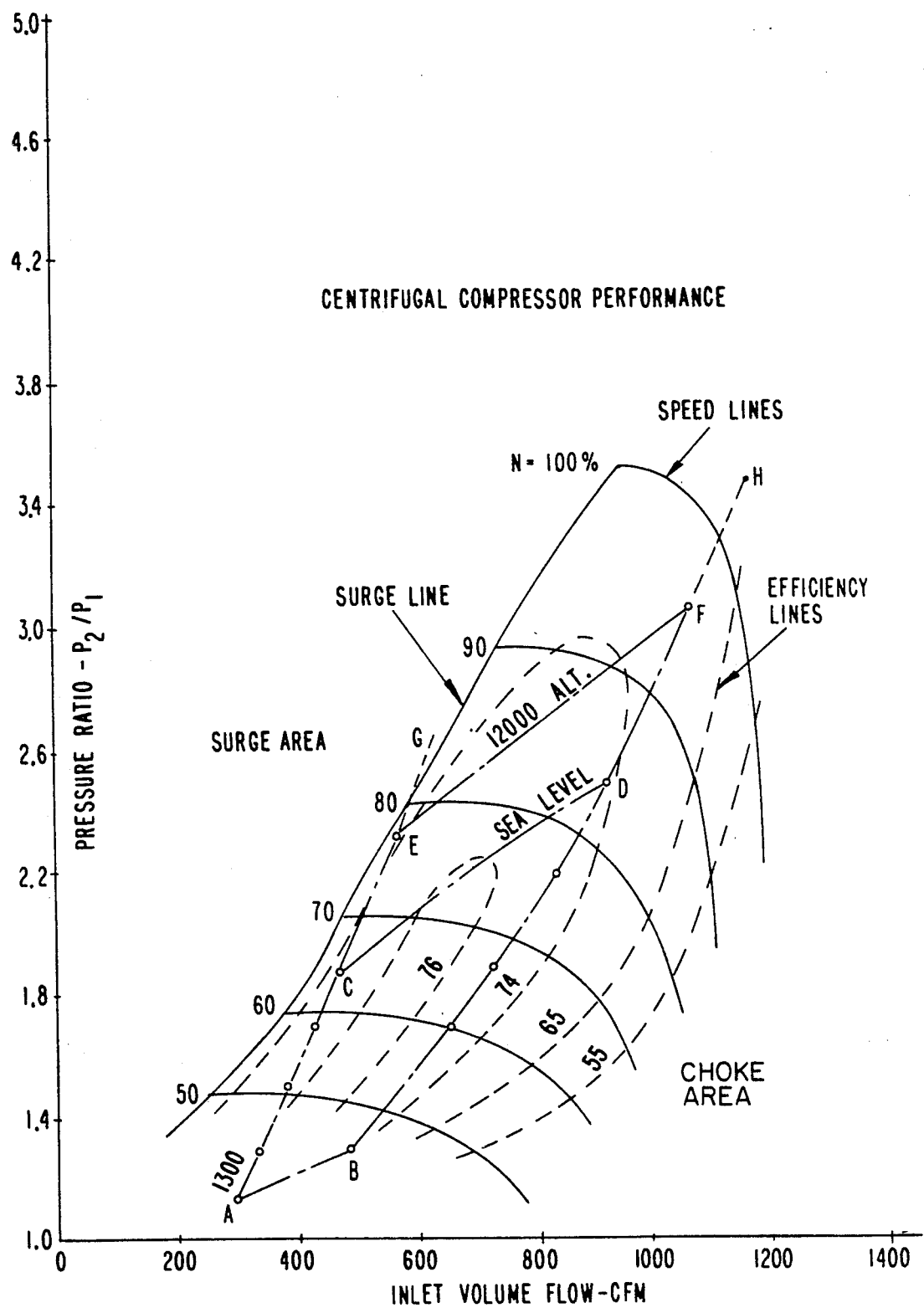
FIG. 2 is as performance map of a compressor stage of FIG. 1, with superimposed air requirements of a highly rated internal combustion engine under expected operating conditions.

The embodiments of FIGS. 7 and 8 are preferably combined into a system like that shown in FIG. 9 to direct substantially all of the engine exhaust gas through one volute passageway 26, 127 and axially through turbine wheel 32, 132 when closure means 51, 151 blocks volute passageway 27, 126.

Where all exhaust gas from a divided engine manifold is diverted into one volute of a twin-flow turbine casing, thus halving the throat area and driving the turbocharger rotor at higher speeds when the engine is operating at full load and low speed, the full-load, low-speed operating point may be forced into the surge area of the compressor, as shown, e.g., by Point G in FIG. 2. It is preferable, therefore, to use a variable geometry compressor along with the variable geometry turbine so that its desirable characteristic of running the turbocharger faster at low-engine speed can be utilized by moving the compressor characteristic to lower flow as noted by the dotted lines in FIG. 6. Movable stator vanes 75a of two-stage, axial-radial compressor means 12 described above can accomplish this purpose.

As indicated above, a control system can sense engine load and speed and move stator vanes 75a to an optimum position for a given engine-operating condition. In addition, the control can move stator vanes 75a to the low-flow position, and can also move closure means 51, 56, 151 in the turbine exhaust gas flow path to channel all engine exhaust gas flow into one volute 27, 127 of a meridionally divided turbine casing 23, at low-engine speeds. At engine speeds above a pre-determined value, the control system can move stator vanes 75a to the high-flow position and simultaneously can move closure means 51, 56, 151 of the turbine exhaust gas flow path to the position where the engine exhaust gas flow is allowed to flow into both volute passages 26, 27, 126, 127 of divided turbine casing 23. By shifting both the compressor and turbine components, the turbocharger can be operated in its best efficiency ranges over the speed range of the engine to which it is applied.

As shown in FIG. 9, a control system 80 of this invention comprises a control 81 with one or more inputs 82 from sensors (not shown) located on the internal combustion engine 57. The internal combustion engine may be provided with sensors to detect, for example, engine speed, air boost pressure from the turbocharger, exhaust gas manifold pressure, engine fuel flow, engine-operating temperature, or other engine-operating parameters. Outputs 82 of such sensors and, if desired, a turbocharger vane position sensor, may be directed to control 81 which can analyze the engine-operating condition from the sensor outputs and determine the desirable conditions of operation of two-stage compressor 12 and variable geometry turbine means 11 of the preferred turbochargers of this invention. Control 81 can include a programmed microprocessor or analog components which can be programmed or combined by those skilled in the art in accordance with this disclosure.

The control system of FIG. 9 also comprises a valve assembly 83 that includes a valve 84 to control the position of stator vanes 75a of two-stage compressor stage 12 and, for the preferred turbochargers of this invention shown in FIG. 9, a valve 85 to control the position of the closure means 53 of turbocharger turbine 11. The turbocharger assembly can be provided with actuators and vane position sensors of any appropriate kind to move and position stator vanes 75a of two-stage compressor 12 or closure means 51, 56, 151 of variable geometry turbine 11 or both. As shown in FIG. 9, control system 80 can include a rotary actuator 86 for operating and supporting ring 96 that may be operated by pressure or vacuum generated by the internal combustion engine and controlled by valve 84 and control 81, and a linear actuator 87 for turbine closure member 51 that may also be operated by engine pressure or vacuum controlled by valve 85 and control 81. Valve 85 may also control the operation of a linear actuator 89 for diverter valve 56 of the turbine closure means. Engine pressure or vacuum may be provided to valve assembly 83 over a conduit or hose 88 and connected with its various valves 84 and 85.

The turbine closure means, including closure member 51 or 151 (FIGS. 7 and 8) and valve means 56, can, thus, be operated by a system control 81. System control 81 can be, for example, triggered by sensors that sense either engine speed or engine boost pressure or both, and can operate closure member 51 or 151 and valve means 56 to maintain turbocharger-operating efficiency according to a preselected program. In a sense, control system 81 makes the turbocharger "shift gears" to provide high boost at low-engine speeds and to accelerate the turbine to high speeds during engine transients. Control system 81 can take many forms and operate the turbocharger system by many programs and algorithms based upon the sensed operating conditions of the internal combustion engine to which the turbocharger is attached. Control system 81 can also include a number of adjustable controls permitting its operating program to be adjusted or changed or fitted to various internal combustion engines.

Stator vanes 75a of two-stage compressor 12 can be operated by system control 80, as set forth above, to provide positive or negative pre-whirl to the air input to the radial-compression stage and, thus, shift the compressor performance map so that the air output of the turbocharger matches the air requirements of the internal combustion engine.

Prior bearing systems are not preferred since they inhibit the manufacture of a reliable two-stage turbocharger. Conventional sleeve bearings do not tolerate a large degree of imbalance in their supported rotating parts and are incapable of damping resonant vibrations of the rotating parts due to such imbalance. The addition of a second stage of compression to a turbocharger is, thus, not desirable with conventional sleeve bearings since in any practical system, the imbalances inherent in such a dual-stage compressor exceed the limitations of such bearing systems.

Floating sleeve-bearing systems have a low load-carrying capability and have difficulty in supporting a turbocharger with two stages of compression. Bearing frictional losses are relatively high in these systems because of the high relative speed between thrust collars rotating at shaft speed and the stationary thrust-bearing surfaces. In addition, floating bearing systems must be held to very close tolerances to maintain dynamic stability; and unbalanced forces must be kept very small, within limits on the order of 0.002-inch ounces.

U.S. Pat. No. 4,641,977, the disclosure of which is incorporated by reference, discloses the bearing system shown in FIG. 3 which is preferred for turbochargers of this invention. The bearing system of U.S. Pat. No. 4,641,977 provides an anti-friction turbocharger bearing system that is free to move radially in response to imbalance in the rotating mass. In addition, the bearing system reduces the relative speeds of rotation between the shaft and the bearing system and between the bearing system and the stationary machine element, thereby eliminating the problems of oil whirl and improving the running life of the bearing system. Thrust loads may be taken at the compressor end of the turbocharger while the shaft is free to expand in response to its exposure to heat through the sleeve bearing at the turbine end of the machine. In the bearing system, the oil films cushion the rotating shaft against shock and vibration, provide adequate lubrication, carry away friction-generated heat from the bearing surfaces, and also tend to carry away heat carried down the shaft from the hot end of the machine. The bearing system may be easily manufactured at low cost and provide a total bearing system that may be inserted easily into the turbocharger, thus providing inexpensive manufacture, repair, and maintenance of the turbocharger.

While I have shown and described a preferred embodiment of my invention, other embodiments may be devised without depasrting from the spirit and scope of the following claims.

I claim:

1. A turbocharger system for an internal combustion engine, comprising:
   means forming a turbine adapted to be driven by exhaust gas from an internal combustion engine comprising:
   a turbine wheel having a central core and a plurality of outwardly extending vanes, said turbine wheel being rotatable about a central axis;
   a meridionally divided volute for exhaust gas surrounding said turbine wheel, said meridionally divided volute including a divider wall defining first and second volute passageways with openings at said turbine wheel;
   means forming a high-pressure compressor driven by said turbine means, said high-pressure compressor comprising:
   a plurality of rotating compressor blades, said compressor blades adapted to be driven in rotation about said central axis by said turbine means to deliver a flow of air at high pressures for an internal combustion engine, and a plurality of stator blades being moveable about longitudinal axes generally transverse to said central axis to impart positive or negative pre-whirl motion to the air leaving the stator blades prior to entering the rotating blades of the compressor stage;
   closure means for providing a flow of engine exhaust gas from one of said first and second volute passageways into said turbine wheel; and
   a control means for operating said closure means and said stator blades in synchronization.

2. The turbocharger system of claim 1 wherein said closure means comprises a diverter valve for directing the engine exhaust gas into said one of said first and second volute passageways.

3. The turbocharger system of claim 2 wherein said closure means comprises a further closure means at the openings of said first and second volute passageways for blocking exhaust gas flow at the other of said first and second volute passageway openings.

4. The turbocharger system of claim 1 wherein said closure means comprises a closure means at the openings of said first and second volute passageways for blocking the flow of exhaust gas from the other of said first and second volute passageways.

5. The trubocharger system of claim 1 wherein said meridionally divided volute directs exhaust gas from said one of said volute passageways into the plurality of outwardly extending turbine vanes generally axially of the turbine wheel.

6. The turbocharger system of claim 1 wherein said high-pressure compressor comprises an axial-compressor stage and a radial-compressor stage.

7. The turbocharger system of claim 6 wherein said axial-compressor stage provides a pressure ratio of about 1.3:1 and said radial-compressor stage provides a pressure ration of about 3.5:1.

8. The turbocharger system of claim 6 wherein said plurality of stator blades is located between said axial-compressor stage and said radial-compressor stage.

9. The turbocharger system of claim 1 wherein said control means provides substantially simultaneous control over said closure means and said stator blades such that said stator blades are positioned to provide negative pre-whirl to the air entering said compressor blades of said high-pressure compressor when said closure means provides flow of the exhaust gas from one of said first and second volute passageways of said meridionally divided volute.

10. The turbocharger system of claim 1 wherein said control means provides substantially simultaneous control over said closure means and said stator blades such that said stator blades are positioned to provide positive pre-whirl to the air entering said compressor blades of said high-pressure compressor when said closure means provides flow of exhaust gas from both first and second volute passageways of said meridionally divided volute.

11. The turbocharger system of claim 1 wherein said control means provides substantially simultaneous control over said closure means and said stator blades such that said stator blades are positioned to provide no pre-whirl to the air entering the compressor blades of said high-pressure compressor when said closure means provides flow of exhaust gas from both first and second volute passageways of said meridionally divided volute.

12. The turbocharger system of claim 1 wherein said means forming a turbine adapted to be driven by exhaust gas has a variable turbine geometry provided by said closure means.

13. The turbocharger system of claim 1 wherein said control means moves and positions said stator blades to match the air output of the compressor to the air requirements of the internal combustion engine and simultaneously operates said closure means to provide corresponding compressor speeds.

14. The turbocharger system of claim 13 wherein said control means moves said stator blades between a first position where said stator blades provide negative pre-whirl motion to the air entering the rotating compressor blades and a second position where said stator blades provide positive pre-whirl motion to the air entering the rotating compressor blades.

15. The turbocharger system of claim 5 wherein said means forming a meridionally divided volute at its turbine wheel opening includes means for directing exhaust gas from said one of said volute passageways of the meridionally divided volute into said turbine wheel substantially tangent to the central core of the turbine wheel.

16. The turbocharger system of claim 5 wherein said means forming a meridionally divided volute at its turbine wheel opening includes means for directing exhaust gas from said one of said volute passageways of the meridionally divided volute into said turbine wheel at less than the maximum diameter of the turbine wheel, and from the other of said volute passageways of the meridionally divided volute into said turbine wheel at substantially the maximum diameter of said turbine wheel.

17. The turbocharger system of claim 1 wherein said turbine includes an exhaust gas outlet and wherein said divider wall is canted in a direction away from said exhaust gas outlet and extends generally rearwardly from said turbine wheel opening, said rearwardly extending divider wall having opposed side surfaces, each of which form an acute angle with said central axis.

18. The turbocharger system of claim 1 wherein the tips of said outwardly extending vanes of said turbine wheel extend closely adjacent to said divider wall at its innermost end for substantially limiting communication between said first and second volute passageways at said turbine wheel opening.

19. The turbocharger system of claim 18 wherein the extension of the turbine blade tips to closely adjacent the volute divider wall takes place at the maximum diameter of the turbine wheel.

20. The turbocharger system of claim 4 wherein said first and second volute passageways define first and second turbine inlet openings permitting exhaust gas from said first and second volute passageways, respectively, to act on the outwardly extending vanes of said turbine wheel, said first volute passageway directing exhaust gas into said turbine wheel substantially radially of said wheel and said second volute passageway directing exhaust gas into said turbine wheel substantially axially of said wheel; and wherein said closure means is located at first and second turbine inlet openings and is movable between a first position in which said first and second turbine inlet openings are open permitting exhaust gas from both said first and second volute passageways to act on the outwardly extending vanes of said turbine wheel during periods of high-engine speed, and a second position in which said first turbine inlet opening is closed permitting exhaust gas from only said second volute passageway to act on the outwardly extending vanes of said turbine wheel during periods of low-engine speed, said turbine comprising a combination-flow turbine when said closure means is in said first position, and an axial-flow turbine when said closure means is in said second position; and wherein said control means positions said stator blades to provide negative pre-whirl to the air entering said compressor blades at the same time as it moves said closure means to said second position.

21. The turbocharger system of claim 1 wherein said control means operates said closure means and stator blades by sensing one or more engine-operating conditions.

22. The turbocharger system of claim 1 wherein a sleeve bearing is located by the system adjacent the means forming a turbine and the rolling bearing is carried by an outer race adapted to be rotatable in the supporting means and is located by the bearing system adjacent the compressor means.

23. The turbocharger system of claim 22 wherein the rolling bearing is a conventional ball bearing carried by an outer race adapted to be rotatable in the supporting means and to carry a sleeve bearing adjacent the turbine means.

24. The turbocharger system of claim 23 wherein the outer race has an elongated, cylindrical, outer bearing surface adapted to be rotatably carried on a film of lubricant within the supporting means, and the sleeve bearing and rolling bearing are separated longitudinally to provide spaced support for the shaft, and the outer race and sleeve bearing include passageways to provide a flow of lubrication to the sleeve bearing and the inner surface of the outer race provides a flow of lubricant from the sleeve bearing to the rolling bearing.

25. The turbocharger system of claim 22 wherein the outer race includes outwardly projecting surfaces and forms a thrust bearing and is adjacent the compressor.

26. The turbocharger system of claim 22 wherein the outer race is adapted to cooperate with the supporting means to permit radial movement in response to imbalance in the system it carries and axial expansion of the rotatable shaft in the sleeve bearing.

27. A turbocharger system for internal combustion engines, comprising:
   means forming a turbine adapted to be driven by exhaust gas from an internal combustion engine; and
   means forming a high-pressure compressor driven by said turbine means, said high-pressure compressor, comprising:
   a plurality of stator blades, and
   a radial-compressor stage formed by a plurality of rotating radial-compressor blades, said radial-compressor blades being driven in rotation by said turbine means to deliver a flow of air at high pressures to an internal combustion engine,
   said plurality of stator blades being movable to vary and adjust compressor output characteristics, said turbine means comprising:
   a turbine wheel having a central core and a plurality of outwardly extending vanes, said turbine wheel being rotatable about a central axis;
   a meridionally divided volute for exhaust gas surrounding said turbine wheel, said meridionally divided volute including means for defining first and second volute passageways having a divider wall therebetween, said first and second volute passageways defining first and second turbine inlet openings permitting exhaust gas from said first and second volute passageways, respectively, to act on the outwardly extending vanes of said turbine wheel, said first volute passageway directing exhaust gas into said turbine wheel substantially radially of said wheel and said second volute passageway directing exhaust gas into said turbine wheel substantially axially of said wheel;
   closure means movable between a first position permitting exhaust gas to flow from both said first and second volute passageways to act on the outwardly extending vanes of said turbine wheel during periods of high-engine speed, and a second position permitting exhaust gas to flow from only said second volute passageway to act on the outwardly extending vanes of said turbine wheel during periods of low-engine speed; and
   a control connected with one or more sensors on the internal combustion engine to operate said stator vanes of the compressor means and the closure means to operate said turbocharger to match the turbocharger air output with the air requirements of the internal combustion engine throughout its operating range.

28. The turbocharger system of claim 27 wherein said closure means is located at said first and second turbine inlet openings and closes said first turbine inlet opening, in said second position.

29. The turbocharger system of claim 28 wherein said closure means further includes a diverter valve connected to said meridionally divided volute to block exhaust gas flow in said first volute passageway in said second position.

* * * * *